United States Patent Office 3,776,971
Patented Dec. 4, 1973

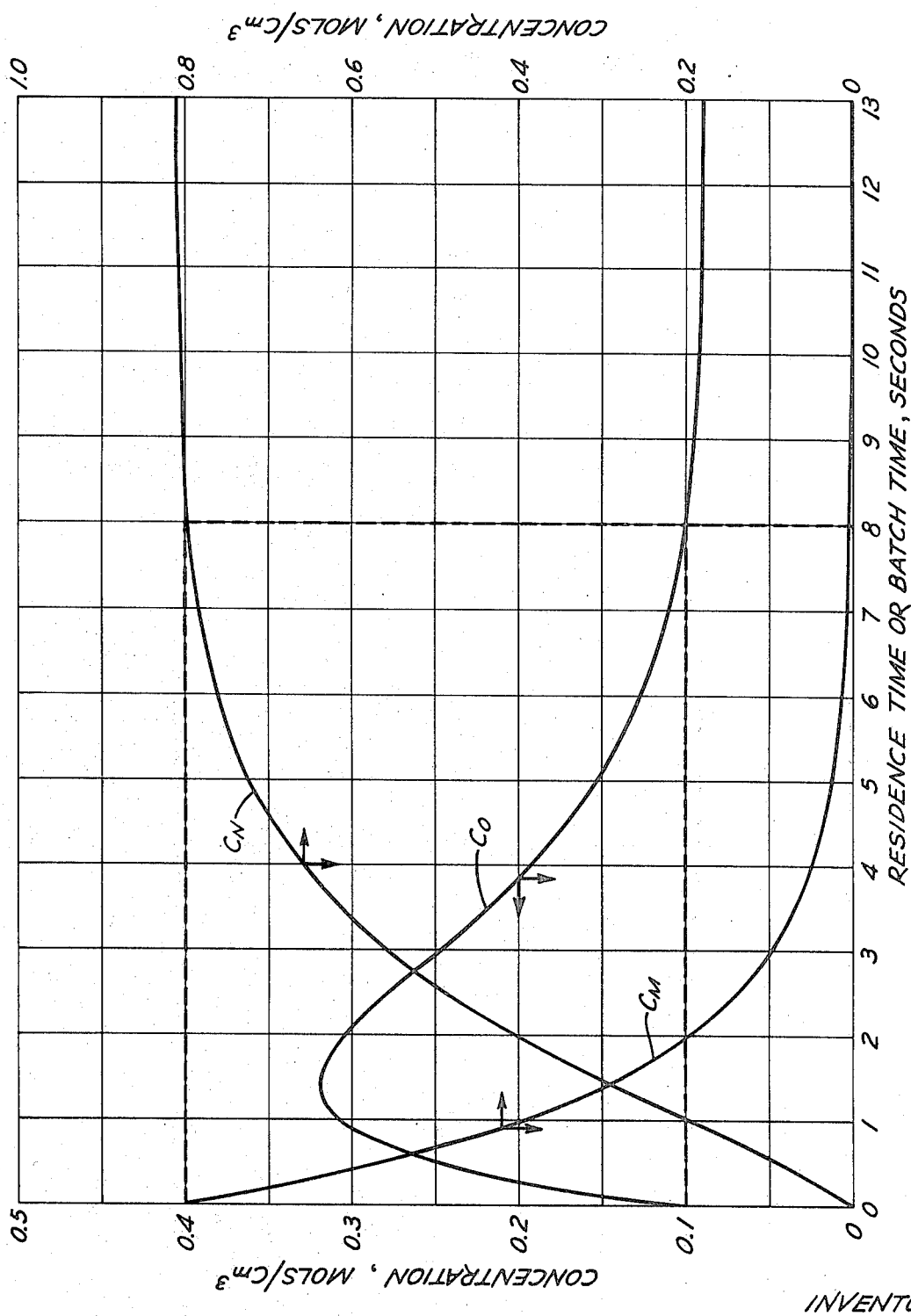
Fig. II

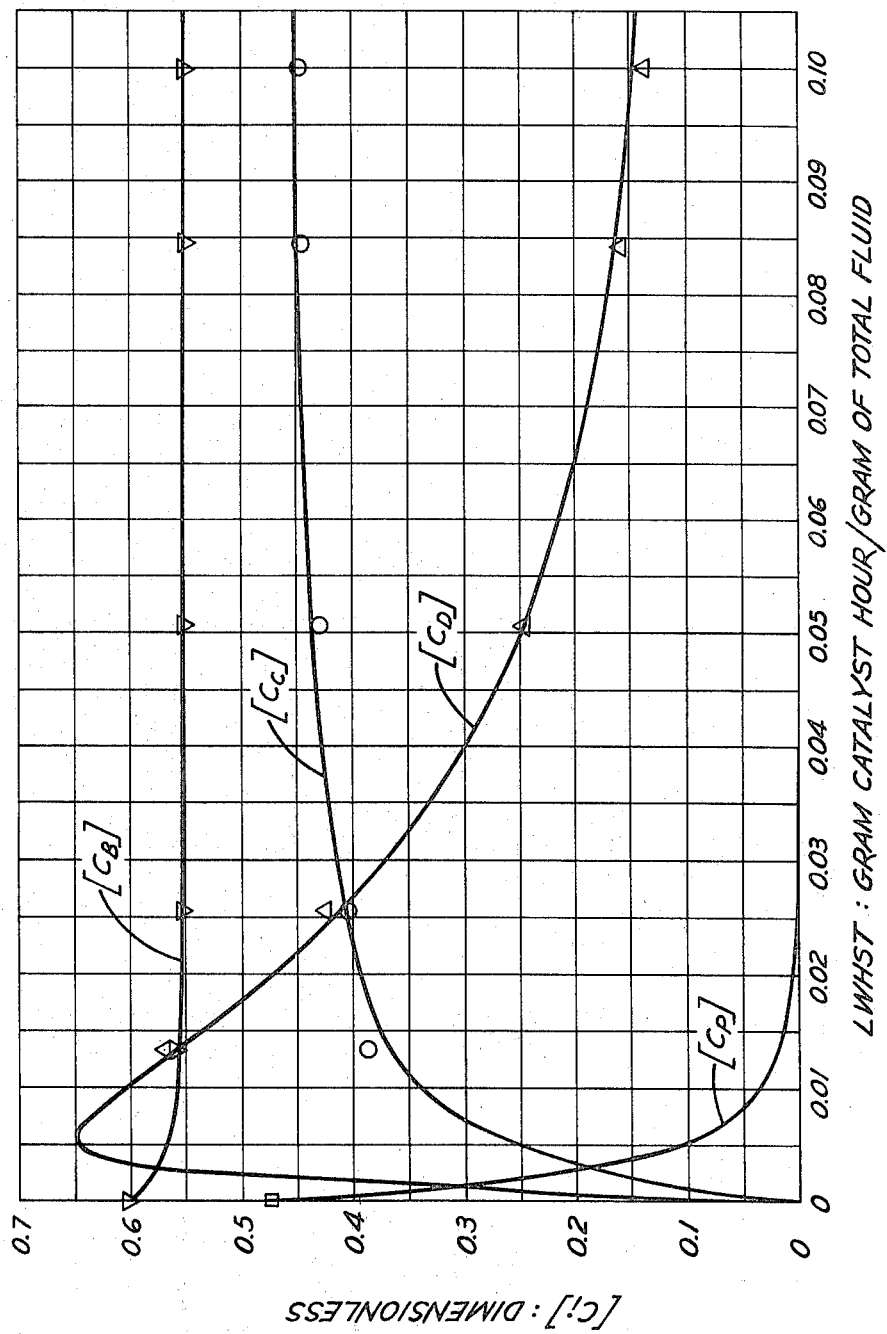
Fig. III

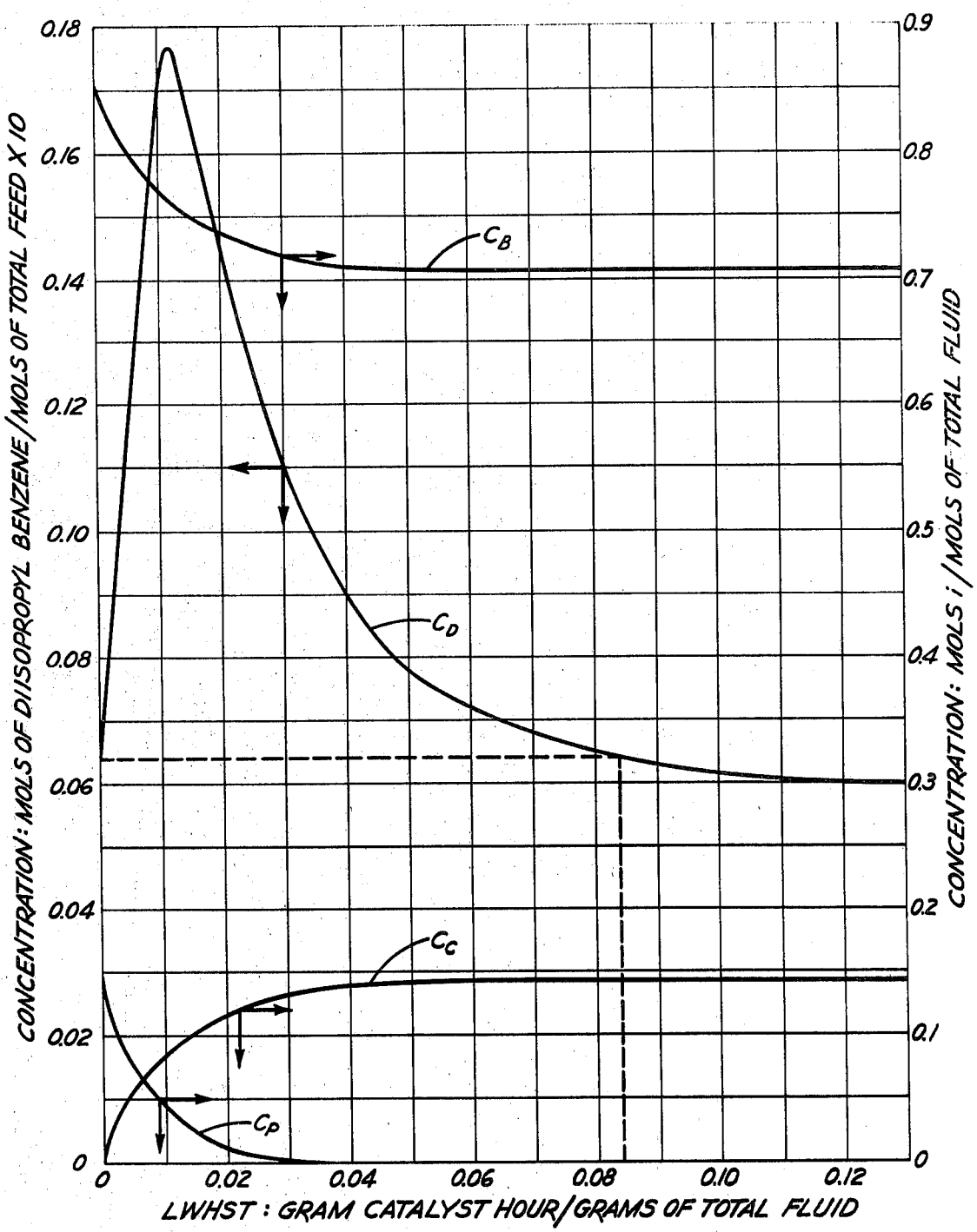
Fig. IV

3,776,971
PROCESS FOR PREPARING A MONOALKYL AROMATIC
Norman L. Carr, Allison Park, and Daniel Y. C. Ko, Pittsburgh, Pa., assignors to Gulf Research & Development Company, Pittsburgh, Pa.
Filed Aug. 13, 1971, Ser. No. 171,474
Int. Cl. C07c 3/52
U.S. Cl. 260—671 P      12 Claims

ABSTRACT OF THE DISCLOSURE

An improvement in a process wherein a first compound is converted to a second compound in an essentially irreversible reaction or to the second compound and to a third compound in essentially irreversible reactions and the second compound and the third compound are convertible to each other in equilibrium-limited reactions which involves introducing the third compound into the reaction zone in an amount greater than the amount that would be present at equilibrium and terminating the process before the reaction mixture reaches equilibrium.

---

Figure 1:
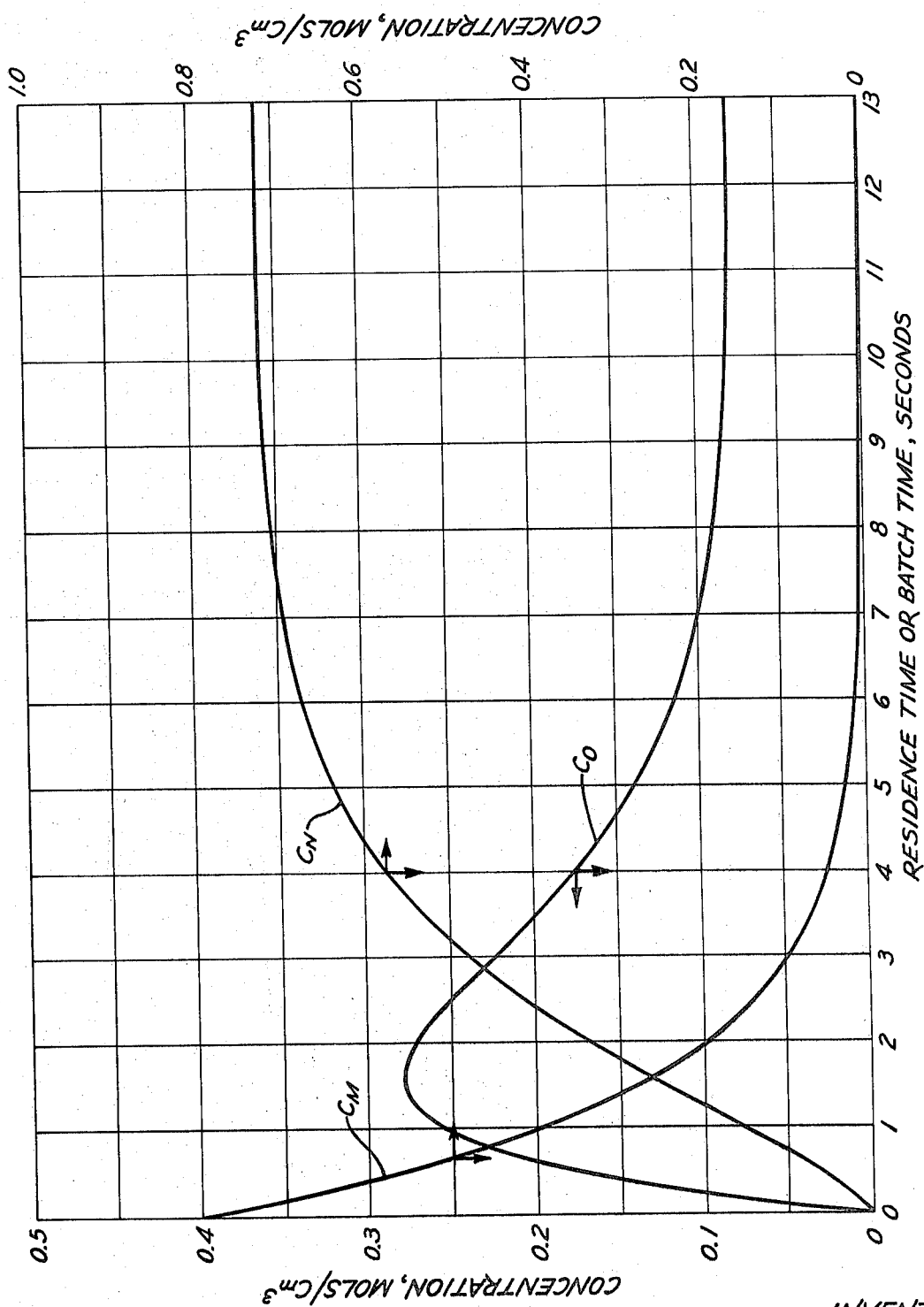

This invention relates to a process wherein there occurs essentially irreversible and equilibrium-limited reactions, illustrated, for example, by the following general reaction mechanism:

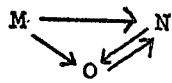

wherein each of M, N and O are chemical compounds. In the above, reactions, a reaction mixture containing compound M is converted, in any manner, batch or continuous operation, with or without catalyst, to compound N in an essentially irreversible reaction or said compound M is converted to said compound N and to compound O in essentially irreversible reactions. Compounds N and O, on the other hand, are convertible to each other in essentially equilibrium-limited reactions. During the course of the reactions the concentration of said compound O reaches an amount in excess of that amount present at equilibrium before the reaction mixture reaches equilibrium.

In accordance with the process defined and claimed herein, we have found that we can minimize the formation of said compound O and, in fact, we can virtually eliminate net production of said compound O in said process, as well as reduce the reaction time, and still maintain desired conversions and selectivity to said compound N, by the mere expedient of adding said compound O to the reaction mixture in an amount greater than the amount that would be present at equilibrium and terminating the process before the reaction mixture reaches equilibrium, preferably when the amount of said compound O in the reaction product corresponds substantially to the amount of said compound O initially added to the reaction mixture. In a preferred embodiment at the ermination of the process, said component O is recovered from the reaction product in any suitable or convenient manner and is recycled.

The reaction mechanisms defined above the merely representative and are equally valid whether or not two or more reactants are employed resulting in the formation of two or more reaction products. For example, procedures such as the reaction of benzene (B) with propylene (P), in batch operation or continuously, to produce a reaction product containing desired cumene (C) and unde- sired diisopropyl benzene (D) fall within the scope of the above reaction mechanisms:

$$B + P \rightarrow C + D$$
$$B + D \rightleftharpoons C$$

The process of this invention can further be illustrated by reference to the following reaction mechanisms:

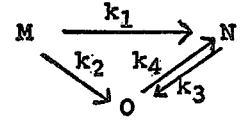

the kinetics of which are postulated as follows: $r_1 = k_1 C_M$, $r_2 = k_2 C_M$, $r_3 = k_3 C_N$ and $r_4 = k_4 C_O$. In the above, $k_1$, $k_2$, $k_3$ and $k_4$ are reaction rate constants, $r_1$, $r_2$, $r_3$ and $r_4$ are reaction rates and $C_M$, $C_N$ and $C_O$ are the concentrations of compounds M, N and O, respectively, and are assumed to have a dimension of mols per cubic centimeter. A differential material balance was set up for each of compounds M, N and O and the resulting differential equations were programmed on an analog computer. The reactions were assumed to take place either in a flow reactor or in a batch reactor. In a flow reactor time is referred to as "residence" time and for a batch reactor the time was considered "actual time" or "batch time." Using the values of $k_1 = 0.0926$, $k_2 = 0.615$, $k_3 = 0.069$ and $k_4 = 0.64$, the concentration profiles shown in FIG. I were obtained, wherein concentration in mols of each component per cubic centimeter of reaction mixture is plotted against residence time or batch time in seconds. A simulation study similar to that of FIG. I was made but wherein the initial reaction mixture contained 0.1 mol of compound O per cubic centimeter of total reaction mixture. The concentration profiles so obtained are illustrated in FIG. II. It can be seen that the equilibrium concentration of compound O is about 0.09 mol per cubic centimeter. Thus, by adding 0.1 mol of compound O to the initial reaction mixture, this compound is present in an amount in excess of that amount that would be present at equilibrium. Note that the concentration of the undesired compound O at a residence time (or batch time) of eight seconds is equal to the initial concentration of compound O. In other words, at this residence time we have virtually eliminated the net production of compound O. This can further be illustrated by noting the concentration profile of compound N. At the residence time of eight seconds compound M is virtually completely converted and the concentration of compound N is equal to the initial concentration of compound M. This means that a selectivity of 100 percent has been achieved. Had the reaction been permitted to reach equilibrium, however, it can be seen that a residence time of about 12 seconds would have been required, which is 50 percent greater than that needed in the practice of this invention. While it is true that at equilibrium some additional amount of compound N would have been produced, it would have come from compound O and not from compound M. No net production or reduction of compound O is desired in the preferred embodiment herein. However, in the situation wherein equilibrium is reached, an additional amount of compound O would be needed in order to maintain the required amount of compound O in the initial reaction mixture.

The process of this invention can further be illustrated by the following. Benzene and propylene were passed over a zeolite catalyst, resulting in the production of cumene and diisopropyl benzene. A zeolite catalyst can be defined as a natural or synthetic hydrated metal alumino-silicate consisting basically of an open, three-dimensional framework of $SiO_4$ and $AlO_4$ tetrahedra, having a silica to alumina molar ratio of at least about 3.0, a pore size large enough to permit internal absorption of benzene and not more than 90 percent of their aluminum atoms associated with monovalent cations, for example, sodium or potassium, and the remainder with polyvalent cations, for example, lanthanum, cerium, etc. and/or ammonium or hydrogen. A particularly effective zeolite is zeolite Y such as defined in U.S. Pat. No. 3,130,007. An example of zeolite Y will fall within the following chemical composition:

$$Na^+{}_{56+y}[(AlO_2)_{56+y}(SiO_2)_{136-y}]$$

wherein $y$ generally has a value of 0, but can vary from −8 to +20. In the specific reaction herein a Y zeolitic molecular sieve of the following unit cell formula was used:

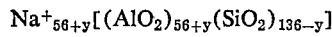
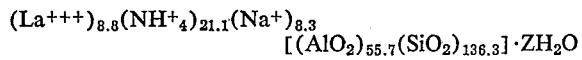

which had been previously heated to a temperature of about 550° C. for about one hour, with, presumably, the loss of $NH_3$ and $H_2O$ therefrom. A one-half inch inner diameter, 52-inch long stainless steel reactor, equipped with a three-inch by 50-inch outer jacket filled with dixylylethane as a heat transfer medium was used. Heat was supplied with a calrod electrical heater and was controlled by a thermoelectric controller. A thermowell extended coaxially through the reactor. The temperature in the reactor was measured by thermocouples evenly spaced through the preheat section, catalyst bed and support section. The pressure was controlled by means of a pressure control valve in the effluent line. Feed to the reactor was pumped upflow by an adjustable stroke proportioning pump from a calibrated feed tank. The reactor was filled with a preheat section of glass beads to a depth of 14 inches. The catalyst section, 13 inches in depth, was composed of 10 grams of the specific 10 to 20 mesh Y type zeolitic molecular sieve catalyst defined immediately hereinabove with two volumes of 8 to 10 mesh quartz per volume of the catalyst. The remaining reactor length was filled with glass beads. The effluent from the reactor was cooled and collected in a gas-liquid separator. The off-gas was measured by a wet test meter, while the liquid product was recovered and weighed. The results obtained are tabulated below in Table I.

ducted to determine the rate constant and the associated activation energies so that the kinetic model represented the experimental data. FIG. III, which is representative, contains the concentration profiles obtained from the reaction of benzene with propylene in a molar ratio of 10:1 and at a temperature of 214° C., wherein $[C_i]$ is plotted agains liquid weight hour space time (LWHST), wherein $[C_i] = C_i / C_{i\ maximum}$, $C_i$, $C_{i\ maximum}$: mols per 100 grams of total fluid, $C_{B\ maximum}=2$, $C_{P\ maximum}=0.25$, $C_{C\ maximum}=0.25$ and $C_{D\ maximum}=0.02$.

A simulation study similar to FIG. III was made but wherein the molar ratio of benzene to propylene was 6:1, the temperature was 232° C. and the initial reaction mixture contained 0.0064 mol of diisopropyl benzene per mol of total feed. The concentration profiles so obtained are illustrated in FIG. IV. It can be seen that the equilibrium concentration of diisopropyl benzene in FIG. III is about 0.006 mol of diisopropyl benzene per mol of total feed. Thus, by adding 0.0064 mol of diisopropyl benzene in the initial reaction mixture, this compound is present in excess of that amount that would be present at equilibrium. Note that the concentration of diisopropyl benzene at a LWHST of 0.084 is equal to the initial concentration thereof. In other words, at this LWHST we have virtually eliminated net production of diisopropyl benzene. This can further be illustrated by noting the concentration profiles of propylene and cumene. At a LWHST of 0.084 propylene is virtually completely converted and the concentration of cumene is equal to the initial concentration of propylene. This means that a selectivity of 100 percent has been achieved. Had the reaction been permitted to reach equilibrium, however, it can be seen that a LWHST of 0.12 would have been required, which is almost 50 percent greater than needed in the practice of this invention.

In a typical reaction exemplifying the type of reaction defined and claimed herein an aromatic compound can be reacted with an olefin to obtain an alkyl aromatic, for example, benzene can be reacted with propylene to obtain cumene as the desired compound and diisopropyl benzene as undesired compound, in a molar ratio of about 1:1 to about 15:1, preferably about 5:1 to about 10:1, at a tem-

TABLE I

| | Run Number | | | | | | | | | | |
|---|---|---|---|---|---|---|---|---|---|---|---|
| | 1 | 2 | 3 | 4 | 5 | 6 | 7 | 8 | 9 | 10 | 11 |
| Pressure, pounds per square inch gauge | 500 | 500 | 500 | 500 | 500 | 500 | 500 | 500 | 500 | 500 | 500 |
| Temperature, ° C | 232 | 232 | 232 | 214 | 214 | 214 | 214 | 232 | 232 | 232 | 232 |
| Benzene to propylene molar ratio | 9.96 | 9.96 | 9.96 | 9.96 | 9.96 | 9.96 | 9.96 | 5.905 | 5.905 | 5.905 | 5.905 |
| LWHST [1] | 0.0127 | 0.0498 | 0.1054 | 0.0129 | 0.02525 | 0.0506 | 0.0833 | 0.01262 | 0.0267 | 0.0515 | 0.1 |
| Reactants (mols per 100 grams): [2] | | | | | | | | | | | |
| Benzene | 1.215 | 1.215 | 1.215 | 1.215 | 1.215 | 1.215 | 1.215 | 1.1733 | 1.1733 | 1.1733 | 1.1733 |
| Propylene | 0.122 | 0.122 | 0.122 | 0.122 | 0.122 | 0.122 | 0.122 | 0.1986 | 0.1986 | 0.1986 | 0.1986 |
| Product (mols per 190 grams): | | | | | | | | | | | |
| Benzene | 1.1027 | 1.10 | 1.09 | 1.109 | 1.1065 | 1.1036 | 1.1023 | 1.066 | 0.9956 | 0.9881 | 0.9810 |
| Cumene | 0.1038 | 0.111 | 0.1128 | 0.0999 | 0.1066 | 0.1075 | 0.1107 | 0.1426 | 0.1655 | 0.1770 | 0.1785 |
| Diisopropyl benzene | 0.00813 | 0.00356 | 0.00273 | 0.01133 | 0.00849 | 0.00485 | 0.0310 | 0.02409 | 0.01223 | 0.00810 | 0.0073 |
| Propylene | 0.0 | 0.0 | 0.0 | 0.0 | 0.0 | 0.0 | 0.0 | 0.0 | 0.0 | 0.0 | 0.0 |

[1] Liquid weight hourly space time=gram catalyst hour/grams of total fluid.
[2] Mols/100 grams of total fluid, with total fluid including total reaction mixture.

Based on the above data the following reaction mechanism and kinetics were proposed:

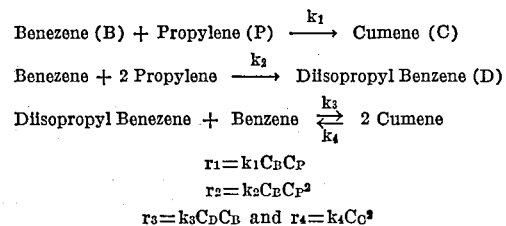

$r_1 = k_1 C_B C_P$ $r_2 = k_2 C_B C_P{}^2$ $r_3 = k_3 C_D C_B$ and $r_4 = k_4 C_C{}^2$ wherein $k_1$, $k_2$, $k_3$ and $k_4$ are reaction rate constants, $r_1$, $r_2$, $r_3$ and $r_4$ are reaction rates (gram mols per hour per gram of catalyst) and $C_B$, $C_P$, $C_C$ and $C_D$ are concentrations (gram mols per gram of total fluid). The reaction mechanism and kinetics were mechanized on an analog computer. Simulation studies were then conperature of about 180° to about 260° C., preferably about 200° to about 235° C., and a pressure of about 350 to about 700 pounds per square inch gauge, preferably about 400 to about 550 pounds per square inch gauge, at a LWHST of about 0.03 to about 1.0, preferably from about 0.04 to about 0.5. The amount of undesired compound that can be present at equilibrium can be from about 0.01 to about 0.15 mol per mol of total final product, generally from about 0.03 to about 0.08 mol. In accordance with the procedure defined and claimed herein the amount of undesired compound added to the initial reaction mixture is in excess of such equilibrium amount, for example, from about 0.1 to about 50, preferably from about one to about 30, percent molar excess. The process is preferably terminated prior to the time the reaction product reaches equilibrium, most preferably when the amount of undesired compound in the reaction product is equal to the amount in the initial reaction mixture.

The improvement herein has been both broadly and specifically described and defined, but it is apparent that the same is applicable to any process wherein there occurs essentially irreversible and equilibrium-limited reactions, as exemplified by the general reaction mechanisms defined above, for example, alkylation reactions, such as the alkylation of benzene with propylene or ethylene to obtain cumene or ethyl benzene, respectively, as desired compounds and diisopropyl benzene or diethyl benzene, respectively, as undesired compounds, or the alkylation of toluene with propylene to obtain cymene as the desired compound and diisopropyl toluene as the undesired compound, dealkylation reactions, such as the reaction of toluene with hydrogen at elevated temperatures to obtain benzene as the desired compound and diphenyl as the undesired compound, etc.

Obviously, many modifications and variations of the invention, as hereinabove set forth, can be made without departing from the spirit and scope thereof, and therefore only such limitations should be imposed as are indicated in the appended claims.

We claim:

1. In a process wherein an olefin is converted, by reaction with an aromatic hydrocarbon, to a monoalkyl aromatic and to a dialkyl aromatic in essentially irreversible reactions and said monoalkyl aromatic and said dialkyl aromatic are convertible to each other in equilibrium-limited reactions, during the course of said reactions the concentration of said dialkyl aromatic reaches an amount in excess of that amount present at equilibrium before the reaction mixture reaches equilibrium, the improvement which comprises introducing said dialkyl aromatic into the reaction zone in an amount greater than the amount that would be present at equilibrium and terminating the reaction before the reaction mixture reaches equilibrium.

2. The process of claim 1 wherein the amount of said dialkyl aromatic in the reaction product upon termination of the reaction corresponds substantially to the amount of said dialkyl aromatic initially added into the reaction zone.

3. The process of claim 2 wherein said dialkyl aromatic in the reaction product is recycled to the reaction zone.

4. The process of claim 1 wherein said olefin is propylene, which is reacted with benzene to obtain cumene, diisopropyl benzene is said dialkyl aromatic and said diisopropyl benzene and cumene are convertible to each other in equilibrium-limited reactions.

5. The process of claim 4 wherein the amount of diisopropyl benzene upon termination of the reaction corresponds substantially to the amount of diisopropyl benzene initially added to the reaction zone.

6. The process of claim 5 wherein the diisopropyl benzene in the reaction product is recycled to the reaction zone.

7. The process of claim 1 wherein the amount of said dialkyl aromatic is initially present in said reaction mixture in an amount from about 0.1 to about 50 percent molar excess of the amount that would be present at equilibrium.

8. The process of claim 1 wherein the amount of said dialkyl aromatic is initially present in said reaction mixture in an amount from about one to about 30 percent molar excess of the amount that would be present at equilibrium.

9. The process of claim 4 wherein the amount of said dialkyl romatic is initially present in said reaction mixture in an amount from about 0.1 to about 50 percent molar excess of the amount that would be present at equilibrium.

10. The process of claim 4 wherein the amount of said dialkyl aromatic is initially present in said reaction mixture in an amount from about one to about 30 percent molar excess of the amount that would be present at equilibrium.

11. The process of claim 4 wherein the reactants are benzene and propylene and are present in a molar ratio of about 1:1 to about 15:1, the reaction temperature is about 180° to about 260° C. and the pressure about 350 to about 700 pounds per square inch gauge.

12. The process of claim 4 wherein the reactants are benzene and propylene and are present in a molar ratio of 5:1 to about 10:1, the reaction temperature is about 200° to about 235° C. and the pressure about 400 to about 550 pounds per square inch gauge.

References Cited

UNITED STATES PATENTS

| | | | |
|---|---|---|---|
| 2,403,785 | 7/1946 | Britton et al. | 260—671 R |
| 2,818,452 | 12/1957 | Mavity | 260—671 P |
| 2,995,611 | 8/1961 | Linn et al. | 260—671 R |
| 2,883,438 | 4/1959 | Egbert | 260—671 P |
| 2,920,118 | 1/1960 | Landeau et al. | 260—671 P |
| 3,274,278 | 9/1966 | Kapur et al. | 260—671 B |
| 3,385,906 | 5/1968 | Kaufman | 260—671 P |

OTHER REFERENCES

Houqen et al.: Chemical Process Principles, Pt. II, 2d edition, John Wiley & Sons, New York (1954), pp. 1020-1.

CURTIS R. DAVIS, Primary Examiner

U.S. Cl. X.R.

260—671 R, 672 T

PO-1050
(5/69)

UNITED STATES PATENT OFFICE
CERTIFICATE OF CORRECTION

Patent No. 3,776,971     Dated December 4, 1973

Inventor(s) Norman L. Carr and Daniel Y. C. Ko

It is certified that error appears in the above-identified patent and that said Letters Patent are hereby corrected as shown below:

Column 1, line 62, "ermination" should be "termination".

Column 1, line 65, "the" should be "are".

Column 3, line 8 of column 1 in Table I, "190 grams" should be "100 grams".

Column 4, line 7, "agains" should be "against".

Signed and sealed this 16th day of April 1974.

(SEAL)
Attest:

EDWARD M. FLETCHER, JR.
Attesting Officer

C. MARSHALL DANN
Commissioner of Patents